(12) United States Patent
Kitamura et al.

(10) Patent No.: US 7,538,523 B2
(45) Date of Patent: May 26, 2009

(54) CONTROL APPARATUS-INTEGRATED GENERATOR-MOTOR

(75) Inventors: Yutaka Kitamura, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 11/783,514

(22) Filed: Apr. 10, 2007

(65) Prior Publication Data

US 2007/0240662 A1     Oct. 18, 2007

(30) Foreign Application Priority Data

Apr. 12, 2006     (JP) ............... 2006-109555

(51) Int. Cl.
   *H02P 9/10*     (2006.01)
   *H02J 7/00*     (2006.01)
(52) U.S. Cl. .......................... 322/33; 322/22
(58) Field of Classification Search ............ 322/22, 322/23, 33, 34
   See application file for complete search history.

(56) References Cited

U.S. PATENT DOCUMENTS

| | | | | |
|---|---|---|---|---|
| 6,081,103 A | * | 6/2000 | Pierret | 322/36 |
| 6,087,734 A | * | 7/2000 | Maeda et al. | 290/40 C |
| 6,118,186 A | * | 9/2000 | Scott et al. | 290/40 B |
| 6,809,428 B1 | * | 10/2004 | Blackburn et al. | 290/37 R |
| 7,116,081 B2 | * | 10/2006 | Wilson | 322/33 |
| 7,199,559 B2 | * | 4/2007 | Yanagi | 322/33 |

FOREIGN PATENT DOCUMENTS

| | | |
|---|---|---|
| JP | 60-074967 A | 4/1985 |
| JP | 2002-153096 A | 5/2002 |
| JP | 2003-113763 A | 4/2003 |
| JP | 2004-156589 A | 6/2004 |

* cited by examiner

*Primary Examiner*—Nicholas Ponomarenko
(74) *Attorney, Agent, or Firm*—Sughrue Mion PLLC

(57) ABSTRACT

The control apparatus-integrated generator-motor has: a generator-motor; and a control apparatus that is constituted by an inverter, a control circuit, a temperature sensor, etc. The control circuit determines whether or not switching element temperature will exceed the maximum permissible temperature when a command for an automatic engine stopping operation is issued. Then, if it is determined that the maximum permissible temperature will be exceeded, generated output of the generator-motor is reduced immediately before the automatic engine stopping operation in such a way that the switching element temperature will not exceed the maximum permissible temperature. The engine is subsequently stopped automatically.

12 Claims, 8 Drawing Sheets

CONTROL APPARATUS-INTEGRATED GENERATOR-MOTOR

BACKGROUND OF THE INVENTION

1. Field of the Invention

The present invention relates to a control apparatus-integrated generator-motor that is mounted to a vehicle.

2. Description of the Related Art

In recent years, reductions in $CO_2$ emissions are being sought in order to prevent global warming. Reduction of $CO_2$ in automobiles means improving fuel consumption performance, and examples of proposed solutions include idling stop when vehicles are stationary, energy regeneration during deceleration, etc. In order to achieve that, automotive generator-motors have been proposed in which a starter motor and a charging generator are integrated. With these conventional automotive generator-motors, a vehicle engine can be restarted by the generator-motor, which is connected to an inverter, after automatic idling stop.

In addition, a technique has been proposed concerning generator-motor idling stop control in which an automatic engine stopping operation is inhibited and engine running is continued even if conditions for performing the automatic engine stopping operation have been met, if it is ascertained that temperatures in respective switching elements in an inverter might exceed a permissible temperature level due to an engine restarting operation after the automatic engine stopping operation (see Patent Literature 1, for example). In this conventional technique, because the subsequent engine restarting operation is avoided if it is suspected that the temperatures in the respective switching elements in the inverter might exceed the permissible temperature level due to the engine restarting operation after the automatic engine stopping operation, the switching elements are prevented from reaching an impermissibly high temperature state during the engine restarting operation.

Patent Literature 1: Japanese Patent Laid-Open No. 2004-156589 (Gazette)

However, inhibiting the engine stopping operation and continuing engine running even if conditions for performing the automatic engine stopping operation have been met if it is ascertained that the temperatures in the respective switching elements in the inverter might exceed a permissible temperature level, as in the conventional technique mentioned above, means that fuel consumption is poor while the automatic engine stopping operation is being inhibited, at the very least. There is a possibility that such conditions may arise frequently in summer, and one problem has been that deterioration in fuel consumption and increases in exhaust gases may occur in no small measures.

In a control apparatus-integrated generator-motor in which an inverter, etc., is disposed integrally on an axial end surface or an outer circumference of the generator-motor, a unique phenomenon also occurs whereby the temperatures of the switching elements of the inverter start to increase immediately during the automatic engine stopping operation during idling stop because heat is received during a power generating operation before the automatic engine stopping operation due to thermal conduction, etc., from an armature winding, which generally has the highest temperature, and because a forced cooling action by fans on the generator-motor is absent during the automatic engine stopping operation. Thus, it has been difficult to determine whether or not the temperature of the switching elements will exceed the permissible temperature level due to the engine restarting operation after the automatic engine stopping operation when the above conventional technique is applied to control apparatus-integrated generator-motors since there are unique temperature increases in these switching elements. Even if the above determination were to become possible, the frequency with which the automatic engine stopping operation is inhibited would increase because the frequency with which the temperature of the switching elements is determined to be in excess of the permissible temperature level would no doubt increase, and in the end, the issue would remain that problems such as deterioration in fuel consumption and increases in exhaust gases are further exacerbated.

SUMMARY OF THE INVENTION

The present invention aims to solve the above problems and an object of the present invention is to provide a control apparatus-integrated generator-motor that suppresses increases in the frequency with which idling stop is inhibited and facilitates improvements in fuel consumption, reductions in exhaust gases, etc., by limiting current that is supplied to switching elements so as to be fixed and set or so as to be controlled so as to be reduced during power output in a power generating operation or during a restarting operation so as to prevent switching element temperatures from exceeding a maximum permissible temperature during a restarting operation after an automatic engine stopping operation during idling stop.

In order to achieve the above object, according to one aspect of the present invention, there is provided a control apparatus-integrated generator-motor including: a generator-motor that has: an armature that has an armature winding; and a rotor, the generator-motor performing power transfer with an engine; and a control apparatus that has: an inverter that is mounted integrally onto an outer circumference or an axial end surface of the generator-motor, and that has a plurality of switching elements; and a control circuit that controls the inverter by a command signal from an idling stop control portion on a vehicle, the control apparatus performing an engine starting operation and a battery charging operation by performing direct-current to alternating-current conversion of electric power in two directions between the generator-motor and a battery.

Electric current that flows to the switching elements is set to a limited value during at least one of a power generating operation or an engine restarting operation of the generator-motor in order to prevent a temperature of the switching elements from exceeding a predetermined threshold value even if the switching elements are subjected to a temperature increase that results from heat received from a high-temperature portion of the generator-motor after an automatic engine stopping operation and a subsequent temperature increase during the engine restarting operation.

According to another aspect of the present invention, there is provided a control apparatus-integrated generator-motor including: a generator-motor that has: an armature that has an armature winding; and a rotor, the generator-motor performing power transfer with an engine; and a control apparatus that has: an inverter that is mounted integrally onto an outer circumference or an axial end surface of the generator-motor, and that has a plurality of switching elements; a control circuit that controls the inverter by a command signal from an idling stop control portion on a vehicle; and a switching element temperature detecting means that detects a temperature of the switching elements, the control apparatus performing an engine starting operation and a battery charging operation by performing direct-current to alternating-current conversion of electric power in two directions between the generator-motor and a battery.

At all times during a power generating operation of the generator-motor, the control circuit determines whether or not the temperature of the switching elements will exceed a predetermined threshold value due to the switching elements being subjected to a temperature increase that results from heat received from a high-temperature portion of the generator-motor after an automatic engine stopping operation and a subsequent temperature increase during an engine restarting operation on an assumption that the automatic engine stopping operation may be performed at any moment, and controls generated output from the generator-motor so as to be reduced such that the temperature of the switching elements is prevented from exceeding the predetermined threshold value if the control circuit determines that the predetermined threshold value will be exceeded.

The control circuit may also detect the temperature of the switching elements by means of the switching element temperature detecting means before an engine restarting operation is executed after an automatic engine stopping operation has been executed, determine whether or not the temperature of the switching elements will exceed a predetermined threshold value if the temperature increase during the engine restarting operation is added to the detected the temperature of the switching elements, and control electric current that flows to the switching elements during the engine restarting operation so as to be reduced such that the temperature of the switching elements is prevented from exceeding the predetermined threshold value if the control circuit determines that the predetermined threshold value will be exceeded.

According to the present invention, the switching element temperature is prevented from exceeding the maximum permissible temperature during the restarting operation after the automatic engine stopping operation during idling stop, preventing the occurrence of damage to the switching elements. In addition, increases in the frequency with which idling stop is inhibited are suppressed, facilitating improvements in fuel consumption and reductions in exhaust gases.

DETAILED DESCRIPTION OF THE PREFERRED EMBODIMENTS

Embodiment 1

Figure 1:
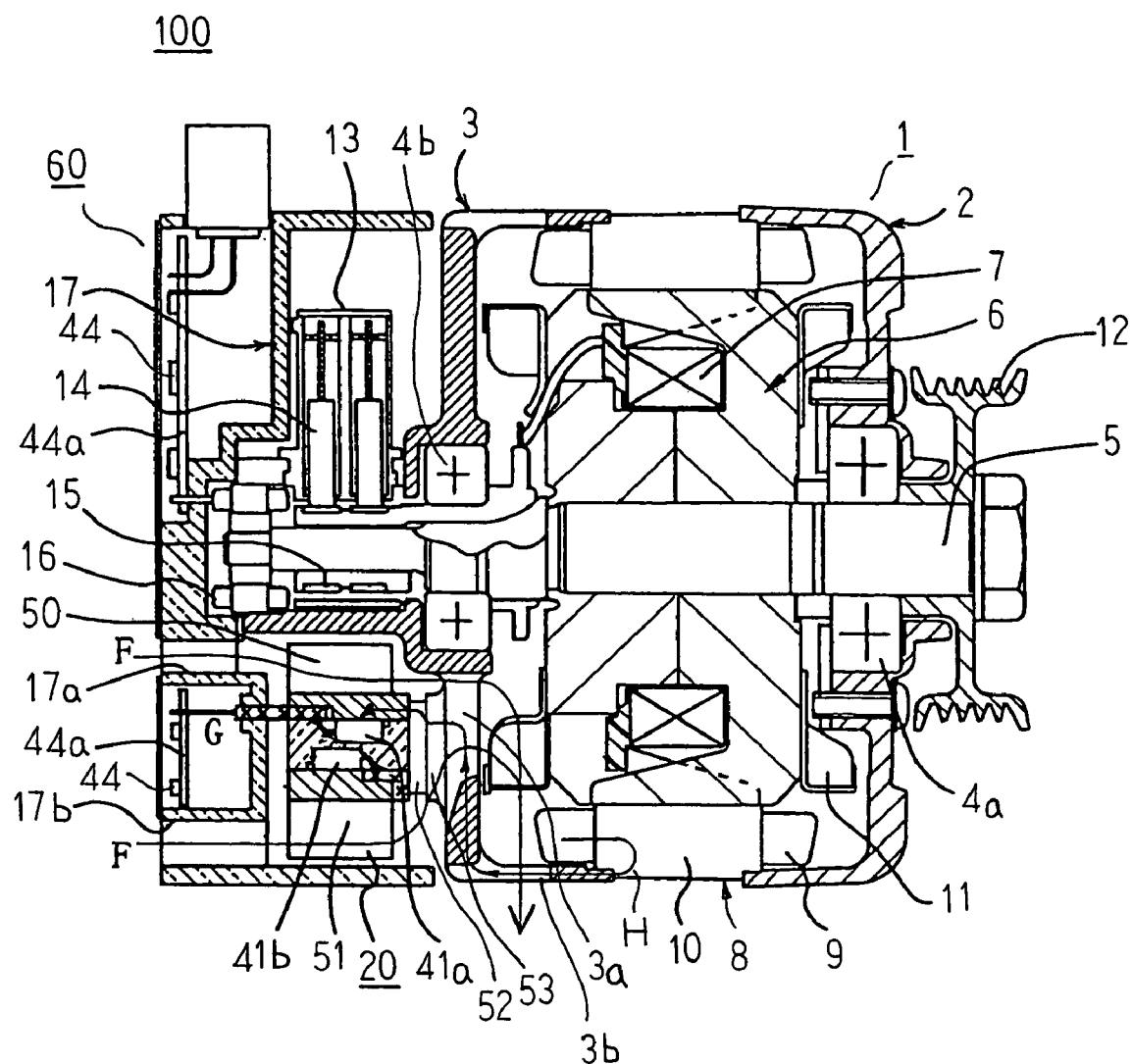
FIG. 1 is a cross section of a control apparatus-integrated generator-motor according to Embodiment 1 of the present invention.

FIG. 1 is a cross section of a control apparatus-integrated generator-motor according to Embodiment 1 of the present invention.

In FIG. 1, a generator-motor 1 includes: a case that is constituted by a front bracket 2 and a rear bracket 3; a shaft 5 that is rotatably disposed in the case by means of supporting bearings 4a and 4b; a rotor 6 that is fixed to the shaft 5 and that has a field winding 7; an armature 8 that is fixed to the case, that is disposed so as to surround the rotor 6, and that has an armature winding 9 and an armature core 10; fans 11 that are fixed to two axial end surfaces of the rotor 6; a pulley 12 that is fixed to a front-end end portion of the shaft 5; a brush holder 13 that is mounted to the rear bracket 3 so as to be positioned on an outer circumference at a rear end of the shaft 5; a pair of brushes 14 that are disposed inside the brush holder 13 so as to slide in contact with a pair of slip rings 15 that are mounted to the rear end of the shaft 5; and a rotational position detecting sensor (resolver, etc.) 16 that is disposed on a rear-end end portion of the shaft 5. The generator-motor 1 is linked to a rotating shaft (not shown) of an engine by means of the pulley 12 and a belt (not shown). Signal output from the rotational position detecting sensor 16 is sent to an idling stop control portion 48 by means of a control circuit 44 that is described below to be used in rotational position detection of the rotor 6, and to be used as control information during a power generating operation and an engine starting operation of the generator-motor 1.

A plurality of first and second switching elements 41a and 41b that constitute an inverter 20, and an inner heatsink 50 and an outer heatsink 51 that are connected to each of the switching elements 41a and 41b are fixed to an outer wall surface of the rear bracket 3 by means of an insulating material 52 and a mounting boss 53 in a space between the rear bracket 3 and a cover 17 that is disposed at a rear end of the rear bracket 3. A control circuit board 44a on which a control circuit 44 is mounted that performs on-off control of the respective switching elements 41a and 41b is disposed on an outer end surface of the cover 17. Although not shown, a temperature sensor 18 that functions as a switching element temperature detecting means is disposed in a vicinity of the switching elements 41a and 41b in close contact with the inner heatsink 50 and the outer heatsink 51.

Thus, a control apparatus-integrated generator-motor 100 is configured in which a control apparatus 60 that is constituted by the inverter 20, the control circuit 44, etc., is disposed integrally on an axial end surface of the generator-motor 1.

In this control apparatus-integrated generator-motor 100, ventilating apertures 17a and 17b are disposed on the cover 17, and a cooling airflow path is formed such that a cooling airflow that is indicated by arrow F in FIG. 1 is generated by rotation of the fans 11 on the rotor 6. The cooling airflow that flows along this cooling airflow path first flows into the cover 17 through the ventilating apertures 17a and 17b that are disposed on the end surface of the cover 17 and cools the control circuit 44, and then respectively cools the inner heatsink 50, the outer heatsink 51, etc. Next, the cooling airflow flows into the case through air intake apertures 3a that are disposed on an end surface of the rear bracket 3, is deflected radially by the fans 11 and cools the armature winding 9, and is finally discharged through air discharge apertures 3b that are disposed on a side surface of the rear bracket 3.

Figure 2:
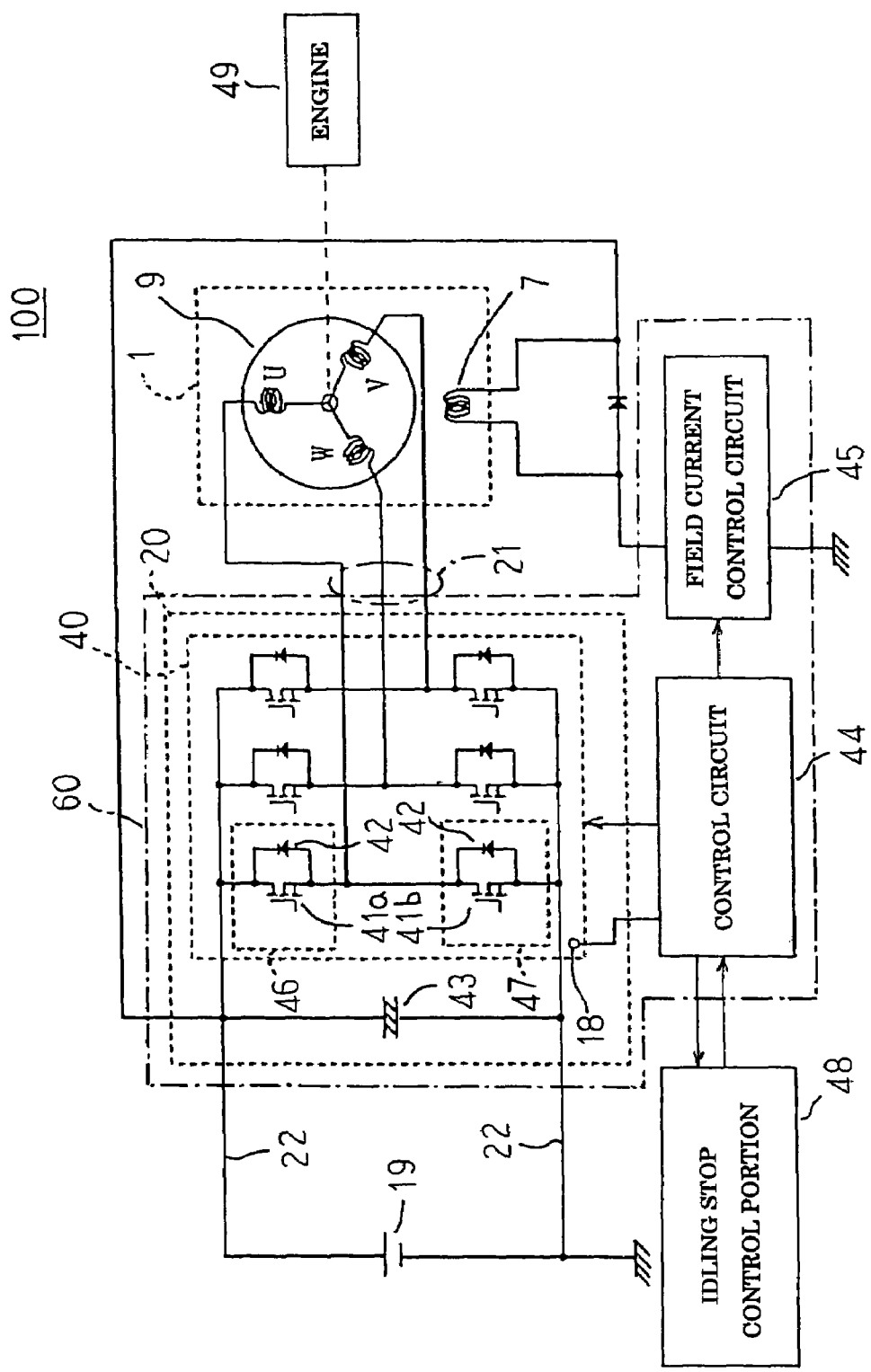
FIG. 2 is a block diagram of a general circuit of the control apparatus-integrated generator-motor according to Embodiment 1 of the present invention.

Next, a control apparatus-integrated generator-motor 100 that is configured in this manner will be explained with reference to FIG. 2. FIG. 2 is a block diagram of a general system configuration that is constituted by the control apparatus-integrated generator-motor according to Embodiment 1 of the present invention and an idling stop control portion on a vehicle.

In FIG. 2, the armature winding 9 of the generator-motor 1 is configured by wye-connecting (star-connecting) three phases of coil (i.e., a U phase, a V phase, and a W phase). The inverter 20 includes: an inverter module 40 that is constituted by the plurality of switching elements 41a and 41b and diodes 42 that are connected in parallel with each of the switching elements 41a and 41b; and a capacitor 43 that is connected in parallel with the inverter module 40.

In the inverter module 40, a first switching element 41a and a diode 42 that constitute an upper arm 46 and a second switching element 41b and a diode 42 that constitute a lower arm 47 are connected in series to form a single set, and three such sets are disposed in parallel.

An end portion of each of the phases of the wye connection in the armature winding 9 is electrically connected by means of alternating-current wiring 21 to a respective intermediate point between the switching elements 41b in the upper arm 46 and the switching elements 41a in the lower arm 47, which are disposed in series. A positive terminal and a negative terminal of a battery 19 are electrically connected by means of direct-current wiring 22 to a positive electrode side and a negative electrode side, respectively, of the inverter module 40.

In the inverter module 40, switching operations of the respective switching elements 41a and 41b are controlled by commands from the control circuit 44. The control circuit 44 also controls a field current control circuit 45 so as to adjust a field current that is supplied to the field winding 7 of the rotor 6.

The idling stop control portion 48 is an electronic control device for an automatic engine stopping operation and a restarting operation that sends a command to initiate the automatic stopping operation or the restarting operation of the engine 49. The idling stop control portion 48 determines whether or not idling stop operations (the automatic stopping operation of the engine 49 and the restarting operation of the engine 49) should be performed based on vehicle information such as vehicle speed information, brake information, etc., and a temperature signal for the switching elements 41a and 41b from the temperature sensor 18, etc., for example, and outputs idling stop operation commands (an automatic stopping operation command for the engine 49 and a restarting operation command for the engine 49) to the control apparatus-integrated generator-motor 100 if it is determined that the idling stop operation should be performed.

In a control apparatus-integrated generator-motor 100 of this kind, during a starting operation of the engine 49, direct-current power is supplied from the battery 19 to the inverter 20 by means of the direct-current wiring 22, and the control circuit 44 performs on-off control of each of the switching elements 41a and 41b of the inverter module 40 so as to convert the direct-current power to three-phase alternating-current power. The three-phase alternating-current power is supplied to the armature winding 9 of the generator-motor 1 by means of the alternating-current wiring 21. Thus, a rotating magnetic field is imparted around the field winding 7 of the rotor 6 to which a field current is being supplied by the field current control circuit 45, driving the rotor 6 to rotate and applying the starting operation to the engine 49 by means of the pulley 12, the belt, a crank pulley, etc.

Then, once the starting operation has been performed on the engine 49, rotational power from the engine 49 is transmitted to the control apparatus-integrated generator-motor 100 by means of the crank pulley, the belt, and the pulley 12. Thus, the rotor 6 is driven to rotate, inducing a three-phase alternating-current voltage in the armature winding 9. Then, the control circuit 44 performs on-off control of the respective switching elements 41a and 41b so as to convert the three-phase alternating-current power that has been induced in the armature winding 9 into direct-current power and charge the battery 19.

Figure 3:
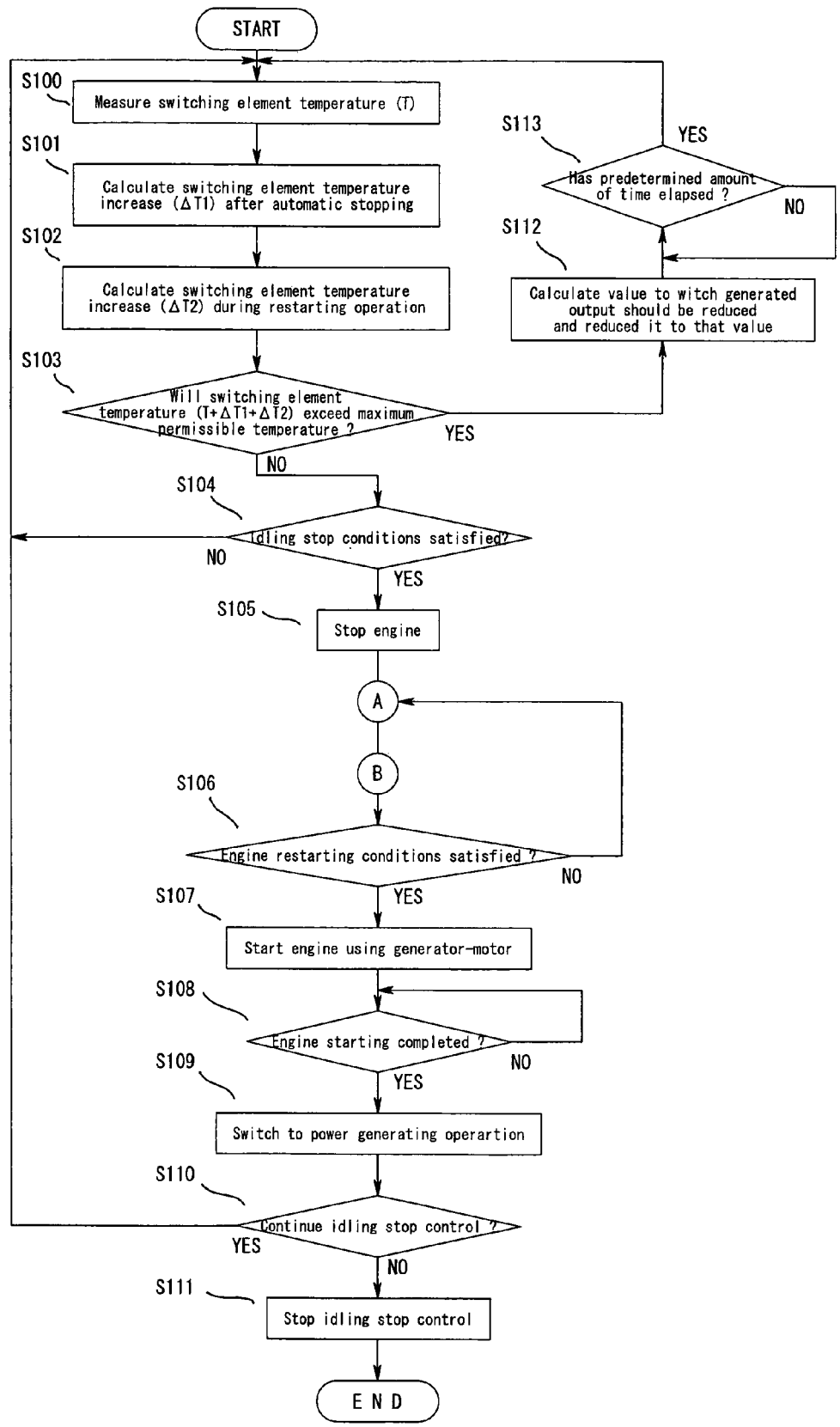
FIG. 3 is a flowchart that explains operation of the control apparatus-integrated generator-motor according to Embodiment 1 of the present invention.

Next, a case in which the control circuit 44, in response to a command from the idling stop control portion 48 on the vehicle, performs idling stop control in such a way that the temperature of the switching elements 41a and 41b of the inverter 20 does not exceed the maximum permissible temperature will be explained with reference to the flowchart that is shown in FIG. 3. Moreover, for convenience, steps 100 through 113 have been represented by S100 through 113 in FIG. 3.

With the vehicle engine 49 in a rotational operation and the control apparatus-integrated generator-motor 100 (the generator-motor 1) in the power generating operation, the control circuit 44 first takes in the output from the temperature sensor 18 and measures a temperature T of the switching elements 41a and 41b (step 100). Next, proceed to step 101 and calculate the temperature increase $\Delta T1$ in the switching elements 41a and 41b after the automatic stopping operation of the engine 49, and then proceed to step 102 and calculate the temperature increase $\Delta T2$ in the switching elements 41a and 41b during the restarting operation of the engine 49. Then, proceed to step 103 and determine whether or not the temperature $(T+\Delta T1+\Delta T2)$ of the switching elements 41a and 41b will exceed a maximum permissible temperature Tmax for the switching elements 41a and 41b during the restarting operation.

If it is determined at step 103 that the temperature of the switching elements 41a and 41b will not exceed the maximum permissible temperature Tmax for the switching elements 41a and 41b during the restarting operation of the engine 49, proceed to step 104. At step 104, the idling stop control portion 48 determines whether or not idling stop conditions have been satisfied based on the determined result from step 103 and other input information for determining whether or not the idling stop conditions are satisfied. If the idling stop conditions have been satisfied, stop the engine 49 by issuing a command for the automatic stopping operation of the engine 49 (step 105), and stand by until restarting conditions for the engine 49 are met (step 106). Then, when the restarting conditions for the engine 49 are met, issue a command to the control circuit 44 for the starting operation of the generator-motor 1 (step 107).

Next, if it is determined from an input rotational speed of the engine 49, etc., that the starting operation has been completed (step 108), then switch to the power generating operation by issuing a command to the control circuit 44 to finish the restarting operation of the engine 49 (step 109). Then, after switching to the power generating operation, determine whether or not to continue idling stop control from step 100 through to step 109 immediately (step 110), and if continuing, return to the first step 100. If not continuing, on the other hand, idling stop control is stopped (step 111).

If it is determined at step 103 that the temperature of the switching elements 41a and 41b will exceed the maximum permissible temperature Tmax for the switching elements 41a and 41b during the restarting operation of the engine 49, then proceed to step 112. Next, the control circuit 44 calculates a value to which power output should be reduced and reduces the power output to that value (step 112), then stands by for a predetermined amount of time (step 113). Then, when the predetermined amount of time has elapsed, return to the first step 100.

If it is determined at step 104 that the idling stop conditions have not been satisfied, then in that case also return to the first step 100.

Figures 5A, 5B, 5C:
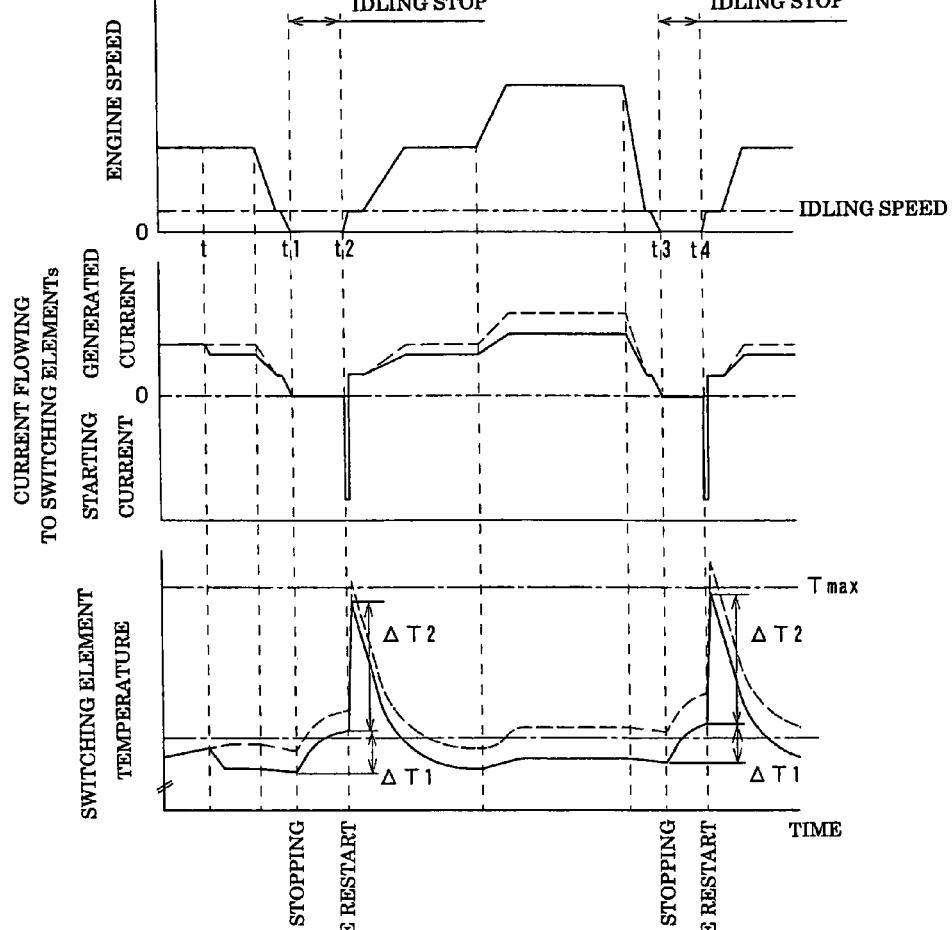
FIGS. 5A through 5C are timing charts that show changes in rotational frequency of an engine, current flowing to switching elements, and switching element temperature increases in an idling stop operation according to Embodiment 1 of the present invention.

Next, behaviors such as the temperature of the switching elements 41a and 41b, generated current, etc., in this idling stop control will be explained with reference to FIGS. 5A through 5C. FIGS. 5A through 5C are timing charts that show changes in rotational speed of an engine, current that flows to switching elements, and temperature in the switching elements in an idling stop operation according to Embodiment 1 of the present invention. FIG. 5A represents changes in engine speed, FIG. 5B represents changes in the current that flows to the switching elements during the power generating operation (battery charging) and the starting operation (battery discharging), and FIG. 5C represents changes in switching element temperature. Moreover, in FIGS. 5A through 5C, solid lines represent a case in which the present invention was implemented, and broken lines represent a comparative example. Here, the comparative example represents a case in which control such as that of the present invention was not implemented.

First, the comparative example that is indicated by the broken lines in FIG. 5 is a case in which control according to the present invention, such as that indicated by the solid lines, is not implemented at any given time t when the generator-motor 1 is in the power generating operation before time t1, at which the engine 49 is automatically stopped, and the temperature of the switching elements 41a and 41b therein increases due to heat transfer from the armature winding 9 after the automatic stopping operation (t1) of the engine 49 and the temperature also increases rapidly due to a large starting operation current that flows during the restarting operation (t2). Thus, circumstances arise in which the temperature of the switching elements 41a and 41b exceeds the maximum permissible temperature for the switching elements 41a and 41b, even if only slightly, which has significant adverse effects on the service life of the switching elements 41a and 41b.

Then, after the restarting operation, a switch is made to the power generating operation and the temperature of the switching elements 41a and 41b decreases rapidly as engine speed increases and the cooling action of the fans 11 starts to prevail over power output. Next, the temperature of the switching elements 41a and 41b increases once again in a similar manner to that described above when automatic stopping operation of the engine 49 is performed at time t3. Then, the temperature of the switching elements 41a and 41b increases rapidly during the restarting operation at time t4 due to the large starting operation current. In this case, the temperature of the switching elements 41a and 41b greatly exceeds the maximum permissible temperature for the switching elements 41a and 41b.

In Embodiment 1, on the other hand, at any given time t before time t1, at which the engine 49 is automatically stopped, a determination is performed as to whether or not the temperature (T+ΔT1+ΔT2) of the switching elements 41a and 41b after the restarting operation will exceed the maximum permissible temperature Tmax for the switching elements 41a and 41b by adding ΔT1, the amount that the temperature will increase due to heat transfer from the armature winding 9 after the automatic stopping operation of the engine 49, and ΔT2, the amount that the temperature will increase due to the large starting operation current that flows during the restarting operation, to the temperature T of the switching elements 41a and 41b, on the assumption that the automatic stopping operation of the engine 49 might be performed at any moment after time t if the idling stop conditions have been satisfied.

Then, because the generated current is lowered to an appropriate value immediately after time t if it is determined that the temperature of the switching elements 41a and 41b will exceed the maximum permissible temperature Tmax, the temperature of the switching elements 41a and 41b at the automatic stopping operation (t1) of the engine 49 after time t and before the restarting operation (t2) of the engine 49 is reduced compared to the comparative example, as indicated by solid lines in FIG. 5C. Thus, even if the temperature of the switching elements 41a and 41b increases rapidly due to the large starting operation current that flows during the restarting operation (t2), the temperature of the switching elements 41a and 41b can be prevented from exceeding the maximum permissible temperature for the switching elements 41a and 41b.

Then, after the restarting operation, a switch is made to the power generating operation and the temperature of the switching elements 41a and 41b decreases rapidly as engine speed increases and the cooling action of the fans 11 starts to prevail over power output. Control that reduces the generated current to an appropriate value continues to be performed on the assumption that the automatic stopping operation of the engine 49 might be performed at any moment even during the power generating operation which is switched to after the restarting operation, so as to prevent the temperature of the switching elements 41a and 41b from exceeding the maximum permissible temperature for the switching elements 41a and 41b even if subjected to the temperature increase ΔT1 after the automatic stopping operation of the engine 49 and the temperature increase ΔT2 during the restarting operation.

Consequently, the temperature of the switching elements 41a and 41b is prevented from exceeding the maximum permissible temperature for the switching elements 41a and 41b even if the automatic stopping operation of the engine 49 is performed at time t3 and the restarting operation is also performed at time t4, thereby preventing the switching elements 41a and 41b from exceeding the maximum permissible temperature and being damaged.

Thus, according to Embodiment 1, because it is assumed that the automatic stopping operation of idling stop may be performed at any moment and the engine restarting operation may also be performed after that automatic engine stopping operation whenever the generator-motor 1 (the control apparatus-integrated generator-motor 100) performs the power generating operation during idling stop control, and a determination is made as to whether or not the switching element temperature will exceed the maximum permissible temperature for the switching elements in that case due to being subjected to temperature increases after the automatic engine stopping operation and temperature increases during the restarting operation, and the generated current is lowered to an appropriate value if it is determined that the maximum permissible temperature for the switching elements will be exceeded, the switching element temperature can be prevented from exceeding the maximum permissible temperature for the switching elements during the restarting operation after the automatic engine stopping operation. Consequently, it is no longer necessary to inhibit application of idling stop to prevent the switching element temperature from exceeding the maximum allowable temperature, enabling improvements in fuel consumption, reductions in exhaust gases, etc., to be facilitated.

Because the switching element temperature can be prevented from exceeding the maximum permissible temperature during the restarting operation after the automatic engine stopping operation, reliability can also be improved.

Because power output is controlled so as to be reduced depending on the engine speed when the engine speed is increased due to switching to the power generating operation after the restarting operation, the power output is reduced while allowing for a balance with cooling. In other words, maximal power output can be extracted within bounds that constantly maintain a balance with cooling, preventing insufficient battery charging.

Because a threshold value that constitutes a determining criterion is set as the maximum permissible temperature for the switching elements, the current that is supplied to the switching elements can be increased maximally, enabling the power output at maximum torque during the restarting operation and during the power generating operation to be set larger. Because the temperature sensor is disposed in a vicinity of the switching elements in close contact with the heatsink, the switching element temperature can be measured accurately.

The inverter is positioned upstream in the cooling airflow path, and the armature winding is positioned downstream in the cooling airflow path. Thus, the cooling airflow that has been warmed by cooling the inverter is supplied to cool the armature winding. The temperature difference between the switching elements and the armature winding is thereby increased, making the switching elements more likely to be affected by the heat from the armature winding. Consequently, this control apparatus-integrated generator-motor has a construction that is optimal when applying the present invention, which estimates switching element temperature increases after the automatic engine stopping operation.

Next, a method for calculating the increase in switching element temperature $\Delta T1$ after the automatic engine stopping operation will be explained.

Figure 6:
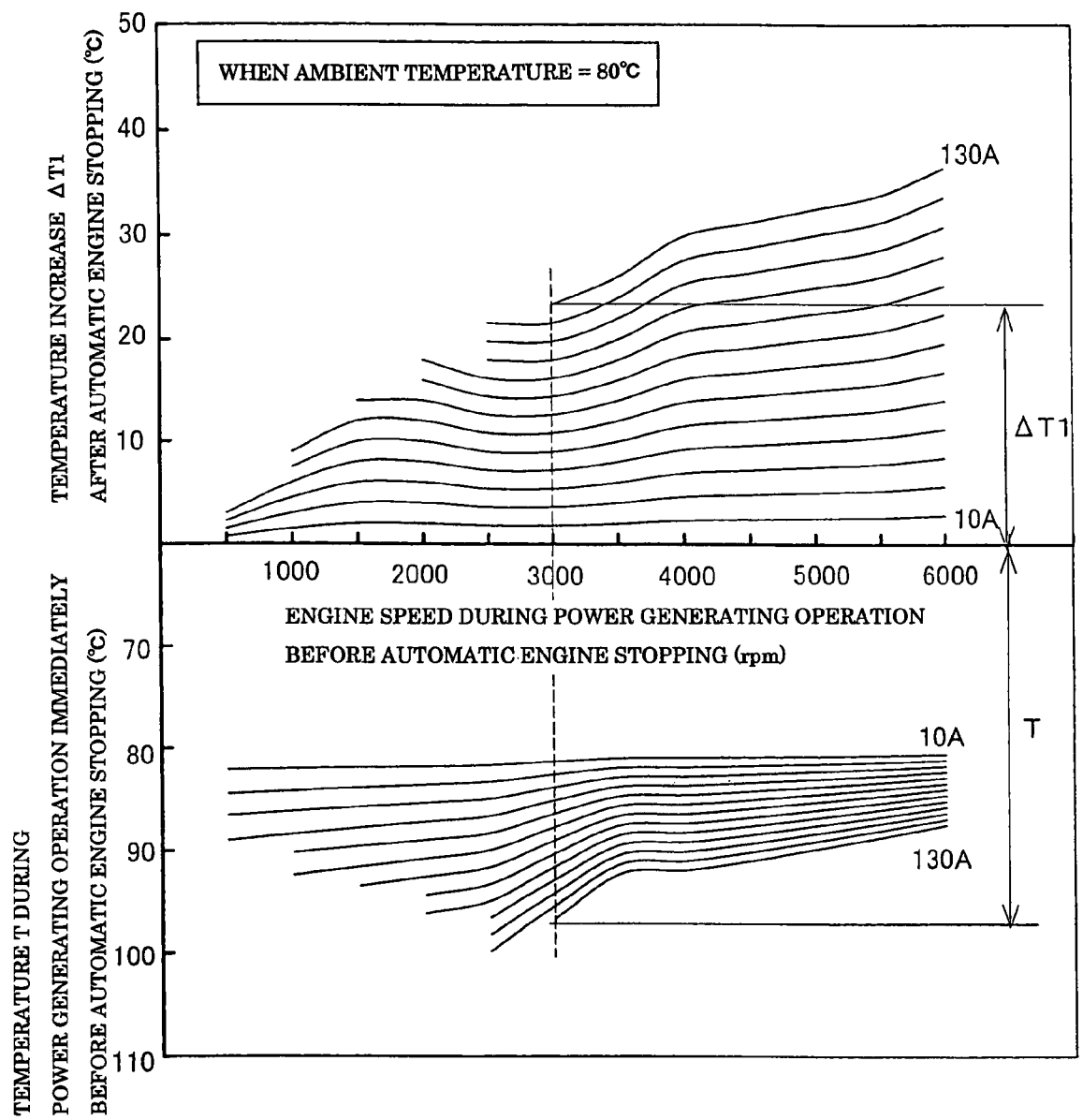
FIG. 6 is a map for finding switching element temperature increases after an automatic engine stopping operation that uses generated current as a parameter and a graph that shows switching element temperature distribution before the automatic engine stopping operation.

Here, the graph in the upper half of FIG. 6 is an example of a map for finding the switching element temperature increase after the automatic engine stopping operation (when the ambient temperature is 80 degrees Celsius), and uses generated current during the power generating operation as a parameter to show relationships between engine speed while outputting that generated current and switching element temperature increase $\Delta T1$ after the automatic engine stopping operation. A plurality of such maps that correspond to different ambient temperatures, for example, are stored in a storage portion (not shown) of the control circuit 44.

The graph in the lower half FIG. 6 is an example of a distribution of the switching element temperature T before the automatic engine stopping operation, and uses generated current during the power generating operation as a parameter to show relationships between engine speed while outputting that generated current and switching element temperature at that time, and is disposed together with the graph in the upper half of FIG. 6 in order to explain the method for finding the appropriate value of generated current during the power generating operation such that the switching element temperature will not exceed the maximum permissible temperature. In practice, the switching element temperature T during the power generating operation before the automatic engine stopping operation need only be found by the temperature sensor.

Here, the control circuit 44 receives ambient temperature and engine speed information signals from the idling stop control portion 48 and also detects the generated current during the power generating operation, and calculates the temperature increase $\Delta T1$ in the switching elements 41*a* and 41*b* after the automatic stopping operation of the engine 49 from the map that is shown in the upper half of FIG. 6. Consequently, the temperature increase $\Delta T1$ in the switching elements 41*a* and 41*b* can be estimated easily. Moreover, an approximating expression for the curves that are shown in the upper half of FIG. 6 may also be stored in the storage portion, and the ambient temperature, the generated current and the engine speed during the power generating operation substituted into the approximating expression to calculate the temperature increase $\Delta T1$ in the switching elements 41*a* and 41*b*. The temperature increase $\Delta T2$ in the switching elements 41*a* and 41*b* during the restarting operation can be calculated from the starting operation current. The starting operation current can be calculated from a starting torque command value.

Figure 7:
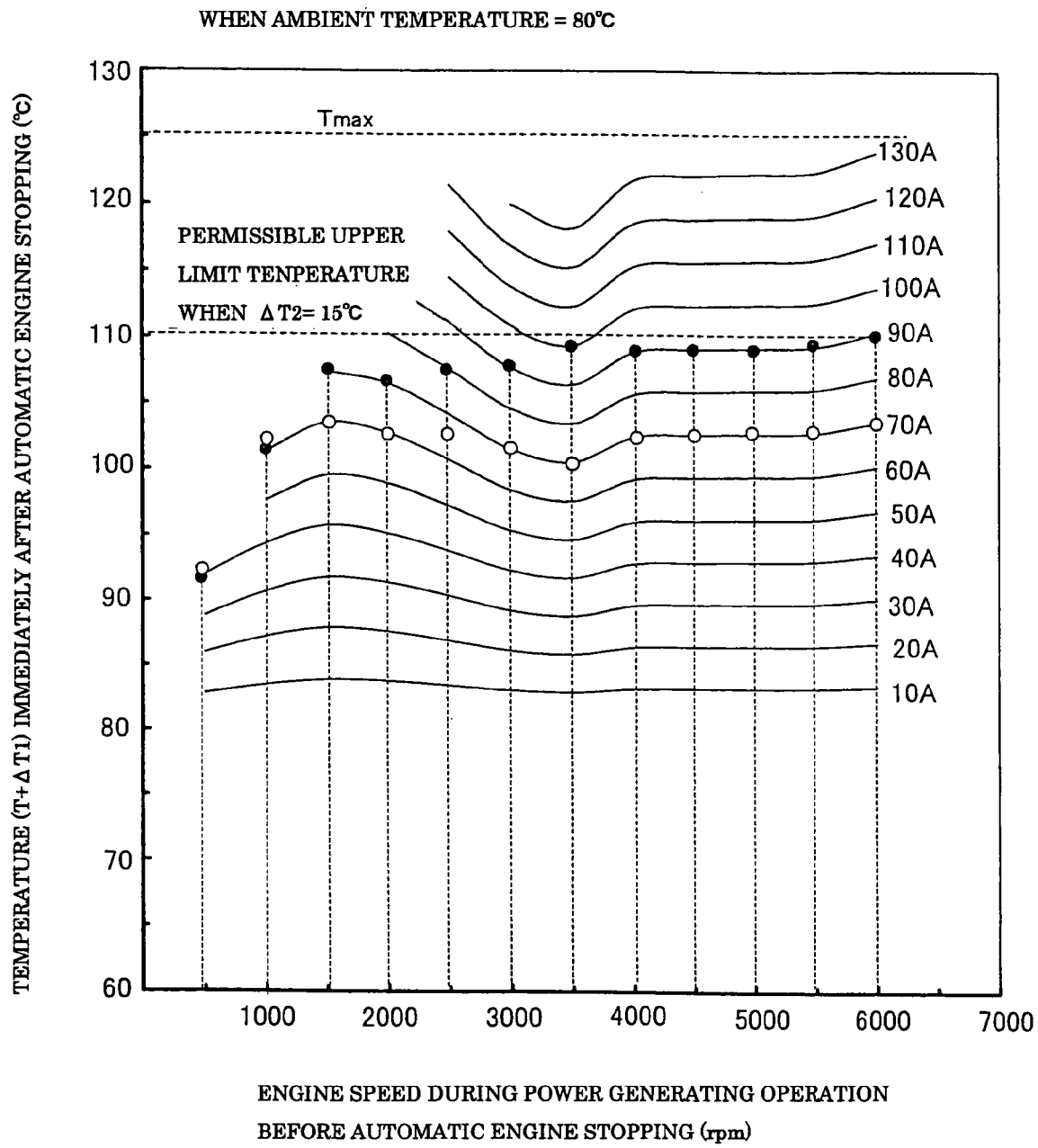
FIG. 7 is an explanatory graph for finding an upper limit of generated current during a power generating operation such that switching element temperature will not exceed a maximum permissible temperature during a restarting operation.

Next, a method will be explained for calculating the appropriate value to which power output should be reduced during the power generating operation if it is determined that the switching element temperature will exceed the maximum permissible temperature for the switching elements during the restarting operation. FIG. 7 is an explanatory graph for a method for finding an appropriate value for generated current during the power generating operation for which switching element temperature will not exceed a maximum permissible temperature during the restarting operation.

FIG. 7 uses generated current during the power generating operation as a parameter to show relationships between engine speed at that generated current output and switching element temperature (T+$\Delta T1$) just before the restarting operation after the automatic engine stopping operation. Thus, if we were to assume, for example, that the maximum permissible temperature Tmax for the switching elements 41*a* and 41*b* was 125 degrees Celsius and the temperature increase $\Delta T2$ during the restarting operation of the engine 49 was a constant 15 degrees Celsius, the permissible upper limit temperature (T+$\Delta T1$) for the switching elements 41*a* and 41*b* just before the restarting operation after the automatic stopping operation of the engine 49 would be 110 degrees Celsius (=Tmax−$\Delta T2$=125° C.−15° C.). In other words, generated current values at which the temperature (T+$\Delta T1$) of the switching elements 41*a* and 41*b* during the power generating operation just before the restarting operation is less than or equal to this 110 degrees Celsius for each respective engine speed would be appropriate values for the generated current in order to prevent the temperature of the switching elements 41*a* and 41*b* from exceeding the maximum permissible temperature Tmax during the restarting operation. In FIG. 7, upper limits of these appropriate values for the generated current are indicated by black dots for each respective engine speed.

The phenomenon whereby the temperature of the switching elements increases after the automatic engine stopping operation will now be explained.

Unlike a generator-motor in which an inverter 20 is disposed as a separate part, in a control apparatus-integrated generator-motor 100 in which the inverter 20 is disposed integrally on an axial end surface of a case, a construction that completely blocks heat from transferring from the armature winding 9 to the inverter 20 is difficult to achieve because the armature winding 9, which reaches the highest temperatures in the generator-motor 1, is disposed in close proximity to the inverter 20 on an opposite side of the rear bracket 3. Thus, since forced cooling of the inverter 20 by the fans 11 is absent after the automatic stopping operation of the engine 49, heat is transferred as indicated by arrow H in FIG. 1 from the high-temperature armature winding 9, through a heat conduction pathway that includes the armature core 10, the rear bracket 3, the mounting boss 53, the insulating material 52, and the heatsinks 50 and 51, to the switching elements 41a and 41b. As a result, the phenomenon arises whereby the temperature of the switching elements 41a and 41b increases after the automatic stopping operation of the engine 49.

Figure 8:
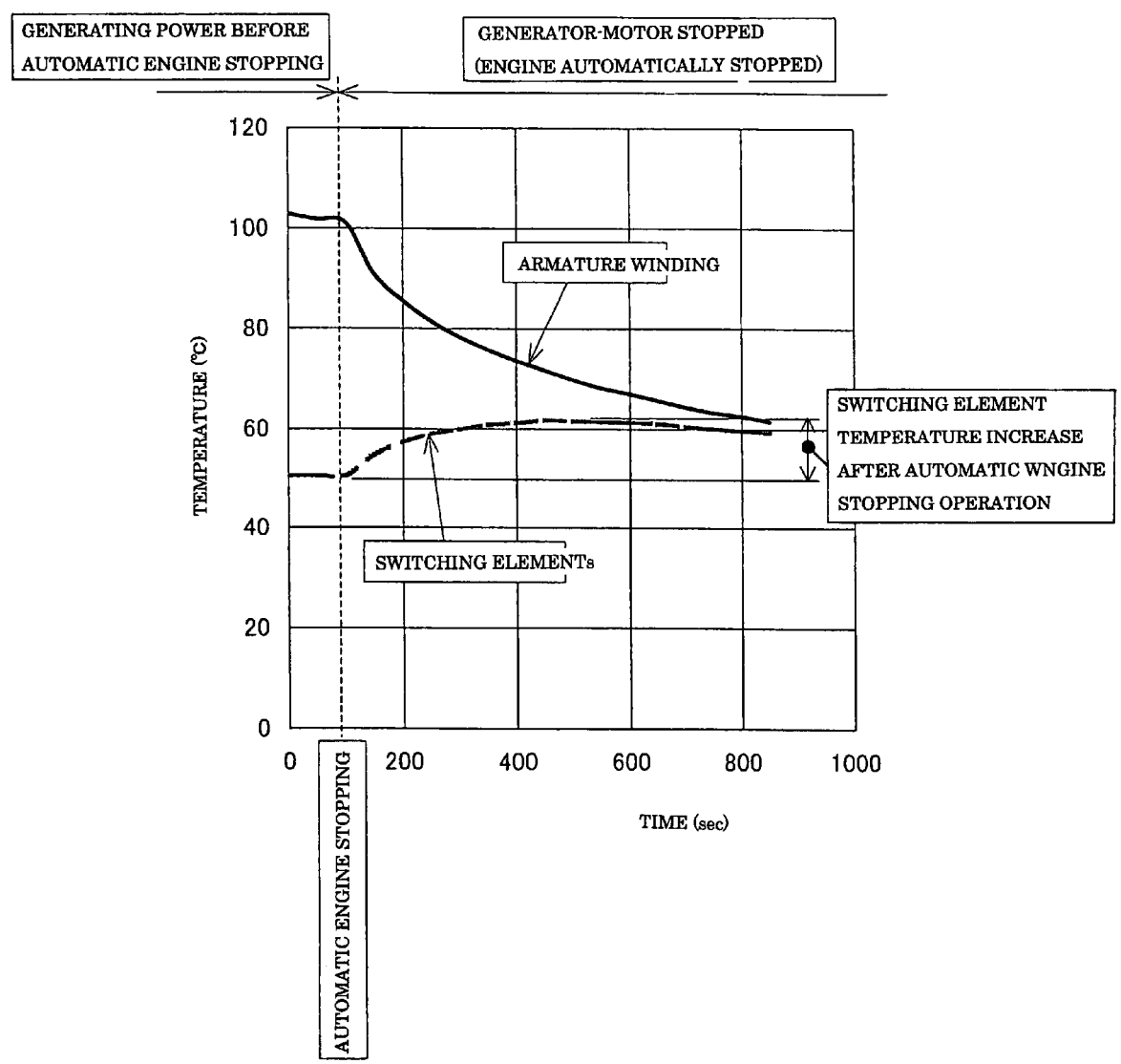
FIG. 8 is a graph of temperature changes in switching elements and an armature winding after an automatic engine stopping operation in a control apparatus-integrated generator-motor.

FIG. 8 is a graph of temperature changes in switching elements and an armature winding after an automatic engine stopping operation in a control apparatus-integrated generator-motor 100.

From FIG. 8, it can be seen that the temperature of the switching elements 41a and 41b begins to increase immediately after the automatic stopping operation of the engine 49, and gradually approaches the temperature of the armature winding 9, which is in contrast decreasing. In other words, the temperature of the switching elements 41a and 41b increases so as to approach the temperature of the armature winding 9 due to heat from the armature winding 9 being transferred to the switching elements 41a and 41b.

An idling stop control method according to Embodiment 1 is optimal for idling stop control in control apparatus-integrated generator-motors 100, in which this unique phenomenon whereby the temperature of the switching elements increases after the automatic engine stopping operation occurs, because a determination is made as to whether or not switching element temperature will exceed the maximum permissible temperature for the switching elements after the restarting operation while allowing for a switching element temperature increase $\Delta T1$ after the automatic engine stopping operation.

Embodiment 2

Figure 4:
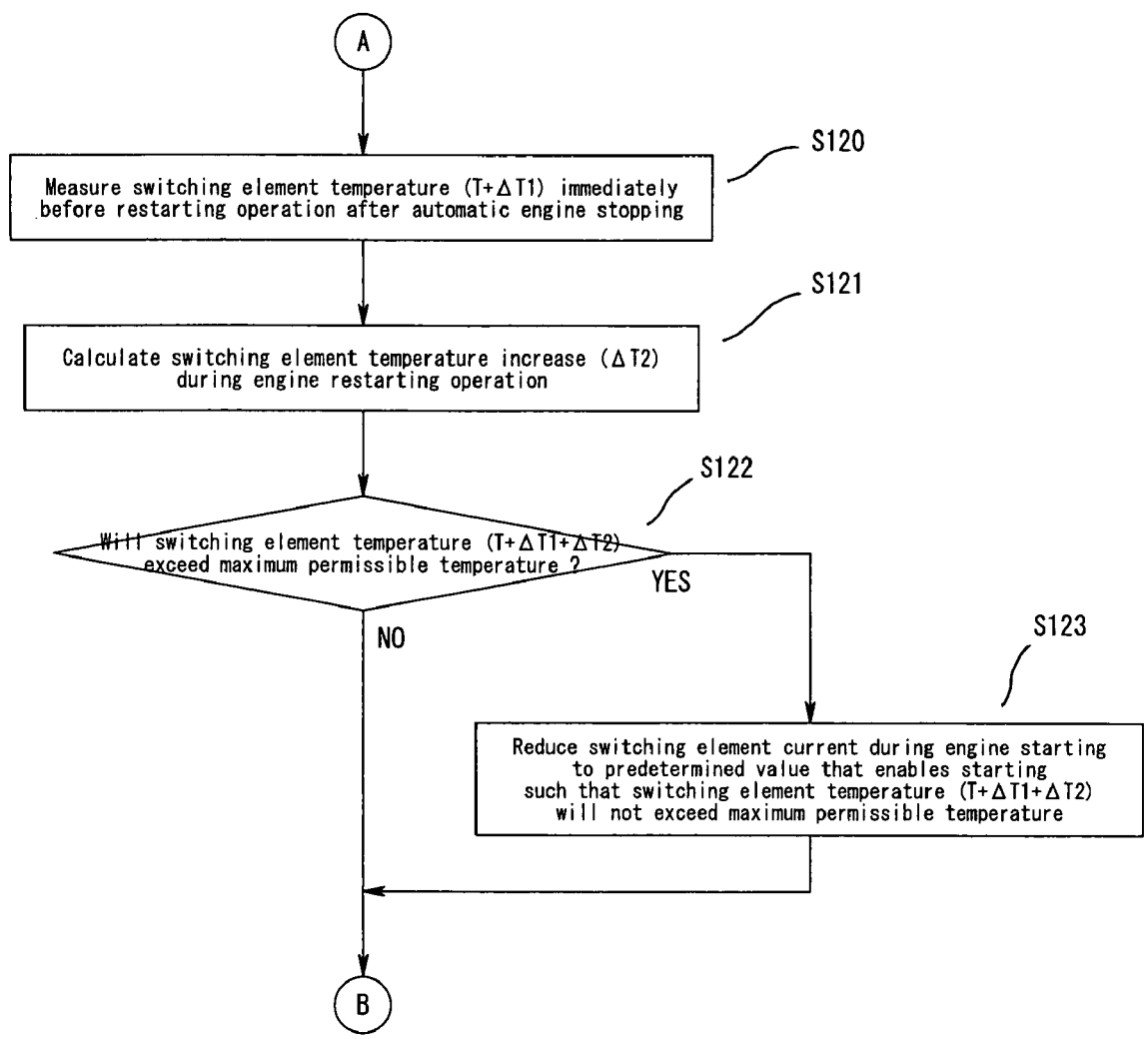
FIG. 4 is a flowchart that explains operation of a control apparatus-integrated generator-motor according to Embodiment 2 of the present invention.

FIG. 4 is a portion of a flowchart of idling stop control according to Embodiment 2 of the present invention, and can be inserted between points A and B between step 105 and step 106 in the flowchart for Embodiment 1 that is shown in FIG. 3.

In Embodiment 2, idling stop control is even more reliably implemented in such a way that the temperature of the switching elements 41a and 41b of the inverter 20 will not exceed the maximum allowable temperature than in the idling stop control that was mentioned in Embodiment 1 above by adding control that is based on the flowchart that is shown in FIG. 4.

Now, in the case of Embodiment 1 above, the automatic stopping operation of the engine 49 will be performed at step 105 if, for example, it is determined at step 103 in FIG. 3 that the temperature $(T+\Delta T1+\Delta T2)$ of the switching elements 41a and 41b during the restarting operation of the engine 49 will not exceed the maximum permissible temperature Tmax and the idling stop conditions are also satisfied at step 104. However, there is a possibility that the temperature of the switching elements 41a and 41b might still exceed the maximum permissible temperature during the restarting operation of the engine 49 if the ambient temperature were to rise suddenly after the automatic stopping operation of the engine 49 due to some external factor.

Thus, Embodiment 2 provides control that can be used to prevent the temperature of the switching elements 41a and 41b from exceeding the maximum permissible temperature Tmax if it is determined that they might do so during the restarting operation of the engine 49 after executing the automatic stopping operation of the engine 49 due to factors such as that described above that are difficult to predict, even if it was determined at step 103 in FIG. 3 that the temperature of the switching elements 41a and 41b during the restarting operation of the engine 49 would not exceed the maximum permissible temperature Tmax. Idling stop control according to Embodiment 2 will be explained below with reference to the flowchart that is shown in FIG. 4. Moreover, for convenience, steps 120 through 123 have been represented by S120 through 123 in FIG. 4.

In Embodiment 2, because steps 100 through 113 in FIG. 3 are equivalent to the content that was explained in Embodiment 1, explanation thereof will be omitted and the flowchart that is shown in FIG. 4 that can be inserted between step 105 and step 106 will be explained.

Idling stop conditions are satisfied (step 104), and the automatic stopping operation of the engine 49 is performed (step 105). Next, proceed to step 120 and measure the temperature $(T+\Delta T1)$ of the switching elements 41a and 41b just before the restarting operation of the engine 49 (step 120). Next, proceed to step 121 and calculate the temperature increase $\Delta T2$ of the switching elements 41a and 41b during the restarting operation of the engine 49 (step 121). Then, proceed to step 122 and determine whether or not the temperature $(T+\Delta T1+\Delta T2)$ of the switching elements 41a and 41b during the restarting operation of the engine 49 will exceed the maximum permissible temperature Tmax.

If it is determined at step 122 that the maximum permissible temperature Tmax will not be exceeded, proceed to step 106 and determine whether restarting operation conditions for the engine 49 have been satisfied. Then, if the conditions have been satisfied, start the engine using the control apparatus-integrated generator-motor 100 (step 107).

On the other hand, if it is determined at step 122 that the maximum permissible temperature Tmax will be exceeded, proceed to step 123 and reduce the switching element current (starting current) during the engine starting operation to a predetermined value that is within a range that enables engine starting in such a way that the temperature $(T+\Delta T1+\Delta T2)$ of the switching elements 41a and 41b will not exceed the maximum permissible temperature Tmax. Next, proceed to step 106 and determine whether or not restarting conditions for the engine 49 have been satisfied.

If the restarting conditions for the engine 49 have not been satisfied at step 106, return to point A preceding step 120, and once again repeat from step 120 to step 123. If it is determined at step 106 that restarting conditions for the engine 49 have been satisfied, start the engine using the control apparatus-integrated generator-motor 100 (step 107).

Thus, in Embodiment 2, the switching element temperature can be reliably prevented from exceeding the maximum permissible temperature during the restarting operation, preventing the switching elements from being destroyed by exceeding the maximum permissible temperature. Increases in the frequency with which idling stop is inhibited can also be suppressed, enabling improvements in fuel consumption, and reductions in exhaust gases, etc., to be facilitated.

Embodiment 3

In Embodiment 1 above, in all periods in which a generator-motor performs a power generating operation, idling stop control is executed on the assumption that an automatic engine stopping operation for idling stop might be performed at any moment and that a engine restarting operation might be performed after that automatic engine stopping operation. In this idling stop control, it is determined whether or not switching element temperature will exceed a maximum permissible temperature for the switching elements due to the switching elements being subjected to a temperature increase after the automatic engine stopping operation and a temperature increase during the restarting operation. Then, if it is determined that the maximum permissible temperature will be exceeded, generated current is lowered to an appropriate value to control the switching element temperature so as not to exceed the maximum permissible temperature for the switching elements during the restarting operation after the automatic engine stopping operation.

In Embodiment 2 above, the switching element temperature immediately before the engine restarting operation is also measured after the automatic engine stopping operation, and the increase in switching element temperature during the engine restarting operation is also calculated to determine whether or not the switching element temperature will exceed the maximum permissible temperature during the engine restarting operation. Then, if it is determined that the maximum permissible temperature will be exceeded, switching element current (starting operation current) is reduced to a predetermined value that is within a range that enables engine starting in such a way as to control the switching element temperature so as not to exceed the maximum permissible temperature for the switching elements during the restarting operation after the automatic engine stopping operation. Problems are thereby avoided such as the switching element temperature exceeding the maximum permissible temperature during the engine restarting operation after the automatic engine stopping operation due to factors that are difficult to predict, even if it was previously determined that the switching element temperature during the engine restarting operation would not exceed the maximum permissible temperature.

In Embodiment 3, in contrast, control is not performed as in Embodiment 1 above, in which the generated output during the power generating operation is output maximally within a range in which the switching element temperature will not exceed the maximum permissible temperature, nor is control performed as in Embodiment 2 above, in which starting torque during the restarting operation is output maximally within a range in which the switching element temperature will not exceed the maximum permissible temperature, but instead the power output during the power generating operation and the starting operation current during the restarting operation are set so as to be constant for each respective engine speed (or rotational speed of the control apparatus-integrated generator-motor) such that the switching element temperature will not exceed the maximum permissible temperature even in the worst cases of given constraints (such as ambient temperature, minimum required torque, etc.).

Embodiment 3 will be explained with reference to FIG. 7.

In FIG. 7, the black dots represent upper limits of the generated current for which the temperature of the switching elements 41a and 41b does not exceed the maximum permissible temperature during restarting of the engine 49, and have been found for each respective engine speed. Moreover, the ambient temperature in this case is 80 degrees Celsius, being the maximum value in an ambient temperature range (−30° C. through 80° C.) that constitutes a constraint, and is the worst case for ambient temperature.

In the case of Embodiment 3, in contrast, the generated currents that correspond to each respective engine speed are set as generating characteristics as indicated by the white dots, and are set to values that are limited so as to be approximately 0 to 20 amperes lower than the upper limits of the generated current that are represented by the black dots. For this reason, the temperature (T+ΔT1) of the switching elements 41a and 41b during the restarting operation is also lower so as to leave a margin with respect to the permissible upper limit temperature.

Even if the ambient temperature is 80 degrees Celsius, as in this case, which is the worst case for the constraint, because the generating characteristics are set such that the temperature (T+ΔT1) of the switching elements 41a and 41b immediately before the restarting operation will be lower than the permissible upper limit temperature by a sufficient margin, the temperature of the switching elements 41a and 41b will also not exceed the maximum permissible temperature during the restarting operation for ambient temperatures that are lower than 80 degrees Celsius under these generating characteristics.

The switching element current (the starting operation current) during the restarting operation of the engine 49 is also set so as to be as small as possible within a range that enables engine starting. Because the temperature increase ΔT2 of the switching elements 41a and 41b during the engine starting operation is thereby kept low, the temperature of the switching elements 41a and 41b during the restarting operation can be reliably prevented from exceeding the maximum permissible temperature.

Thus, in Embodiment 3, the switching element temperature can be reliably prevented from exceeding the maximum permissible temperature during the restarting operation, preventing the switching elements from being destroyed by exceeding the maximum permissible temperature. Increases in the frequency with which idling stop is inhibited are also restricted, enabling improvements in fuel consumption and reductions in exhaust gases, etc., to be facilitated.

What is claimed is:

1. A control apparatus-integrated generator-motor comprising:
 a generator-motor comprising:
  an armature that has an armature winding; and
  a rotor,
  said generator-motor performing power transfer with an engine; and
 a control apparatus comprising:
  an inverter that is mounted integrally onto an outer circumference or an axial end surface of said generator-motor, and that has a plurality of switching elements; and
  a control circuit that controls said inverter by a command signal from an idling stop control portion on a vehicle,
  said control apparatus performing an engine starting operation
  and a battery charging operation by performing direct-current to alternating-current conversion of electric power in two directions between said generator-motor and a battery,
 wherein electric current that flows to said switching elements is set to a limited value during at least one of a power generating operation or an engine restarting operation of said generator-motor in order to prevent a temperature of said switching elements from exceeding a predetermined threshold value even if said switching elements are subjected to a temperature increase that results from heat received from a high-temperature portion of said generator-motor after an automatic engine stopping operation and a subsequent temperature increase during said engine restarting operation.

2. A control apparatus-integrated generator-motor according to claim 1, wherein said high-temperature portion of said generator-motor is constituted by said armature winding and a portion in a vicinity thereof.

3. A control apparatus-integrated generator-motor according to claim 1, wherein said temperature increase in said switching elements that results from heat received from said high-temperature portion of said generator-motor is calculated based on rotational frequency of said generator-motor during said power generating operation before said automatic engine stopping operation and on output current and ambient temperature at that time.

4. A control apparatus-integrated generator-motor according to claim 1, wherein said predetermined threshold value is a maximum permissible temperature for said switching elements.

5. A control apparatus-integrated generator-motor according to claim 1, wherein said inverter and said generator-motor are configured so as to be cooled by a single cooling air flow such that said inverter is disposed upstream in said cooling air flow and said generator-motor is disposed downstream.

6. A control apparatus-integrated generator-motor comprising:
    a generator-motor comprising:
        an armature that has an armature winding; and
        a rotor,
        said generator-motor performing power transfer with an engine; and
    a control apparatus comprising:
        an inverter that is mounted integrally onto an outer circumference or an axial end surface of said generator-motor, and that has a plurality of switching elements;
        a control circuit that controls said inverter by a command signal from an idling stop control portion on a vehicle; and
        a switching element temperature detecting means that detects a temperature of said switching elements,
        said control apparatus performing an engine starting operation
        and a battery charging operation by performing direct-current to alternating-current conversion of electric power in two directions between said generator-motor and a battery,
    wherein at all times during a power generating operation of said generator-motor, said control circuit determines whether or not said temperature of said switching elements will exceed a predetermined threshold value due to said switching elements being subjected to a temperature increase that results from heat received from a high-temperature portion of said generator-motor after an automatic engine stopping operation and a subsequent temperature increase during an engine restarting operation on an assumption that said automatic engine stopping operation may be performed at any moment, and controls generated output from said generator-motor so as to be reduced such that said temperature of said switching elements is prevented from exceeding said predetermined threshold value if said control circuit determines that said predetermined threshold value will be exceeded.

7. A control apparatus-integrated generator-motor according to claim 6, wherein said control circuit detects said temperature of said switching elements by means of said switching element temperature detecting means before an engine restarting operation is executed after an automatic engine stopping operation has been executed, determines whether or not said temperature of said switching elements will exceed a predetermined threshold value if said temperature increase during said engine restarting operation is added to said detected said temperature of said switching elements, and controls electric current that flows to said switching elements during said engine restarting operation so as to be reduced such that said temperature of said switching elements is prevented from exceeding said predetermined threshold value if said control circuit determines that said predetermined threshold value will be exceeded.

8. A control apparatus-integrated generator-motor according to claim 6, wherein said high-temperature portion of said generator-motor is constituted by said armature winding and a portion in a vicinity thereof.

9. A control apparatus-integrated generator-motor according to claim 6, wherein said temperature increase in said switching elements that results from heat received from said high-temperature portion of said generator-motor is calculated based on rotational frequency of said generator-motor during said power generating operation before said automatic engine stopping operation and on output current and ambient temperature at that time.

10. A control apparatus-integrated generator-motor according to claim 6, wherein said predetermined threshold value is a maximum permissible temperature for said switching elements.

11. A control apparatus-integrated generator-motor according to claim 6, wherein said switching element temperature detecting means is disposed so as to be placed in close contact with a radiating heatsink to which said switching elements are joined or placed in close contact.

12. A control apparatus-integrated generator-motor according to claim 6, wherein said inverter and said generator-motor are configured so as to be cooled by a single cooling air flow such that said inverter is disposed upstream in said cooling air flow and said generator-motor is disposed downstream.

* * * * *